UNITED STATES PATENT OFFICE.

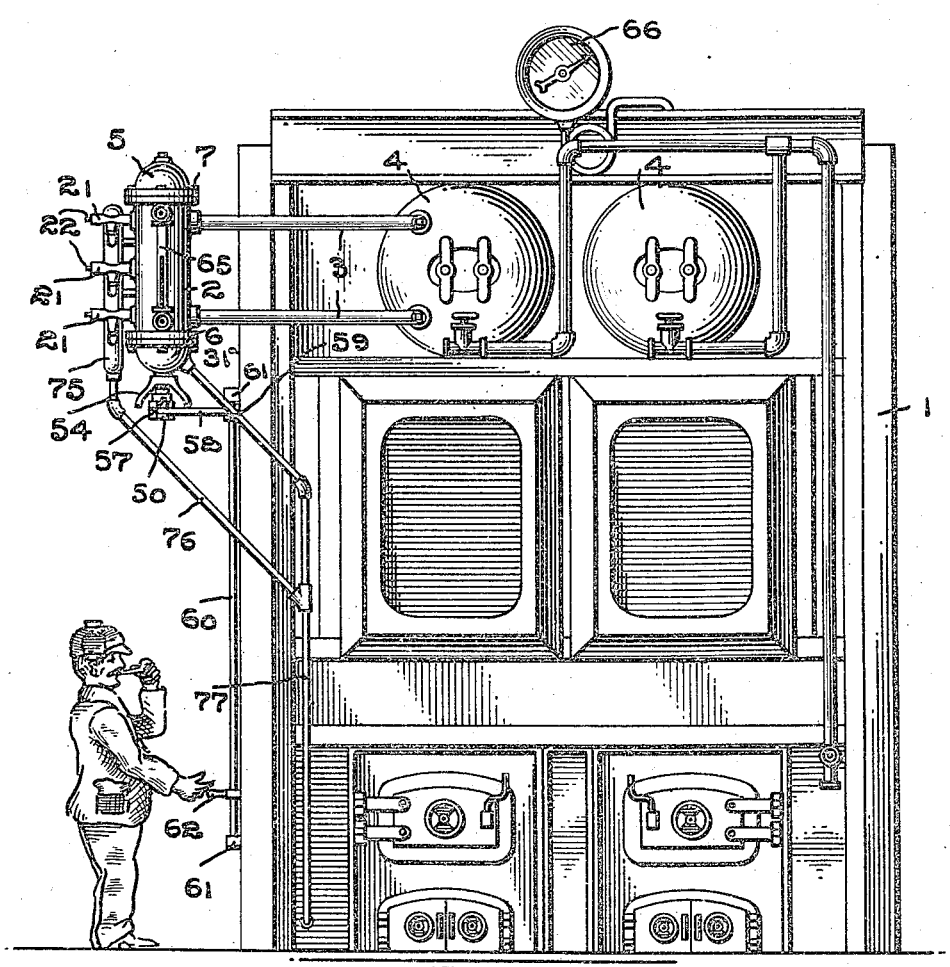

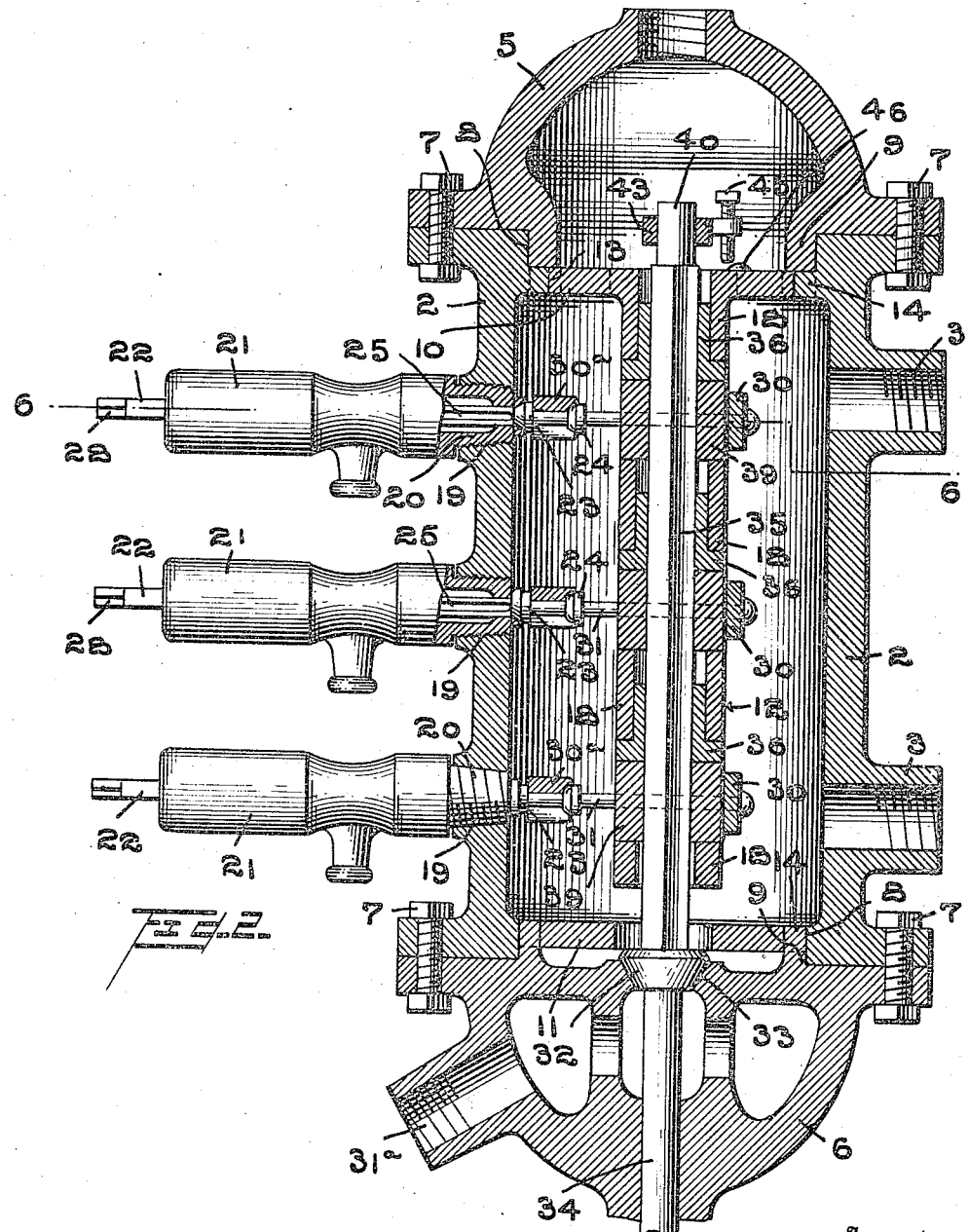

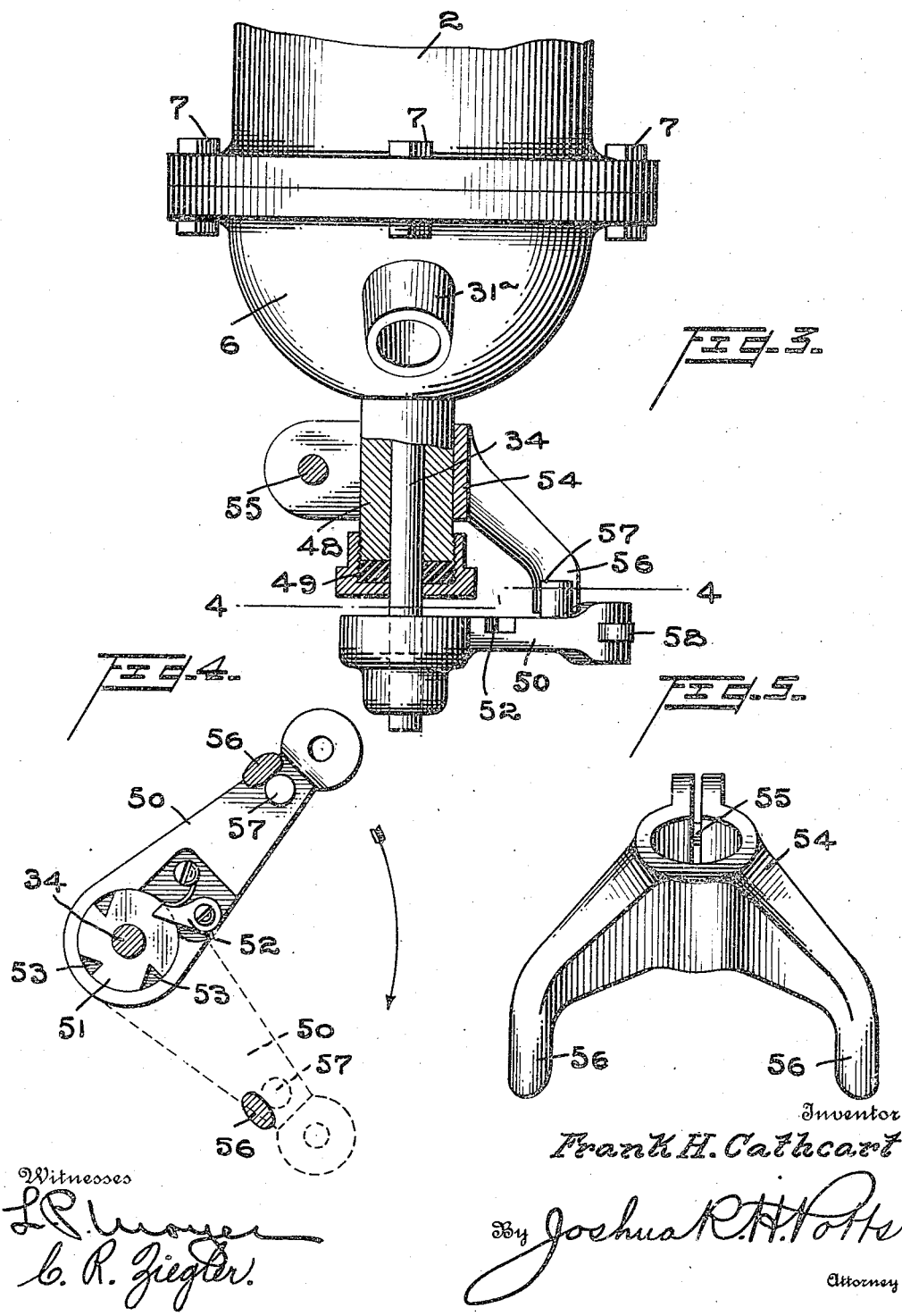

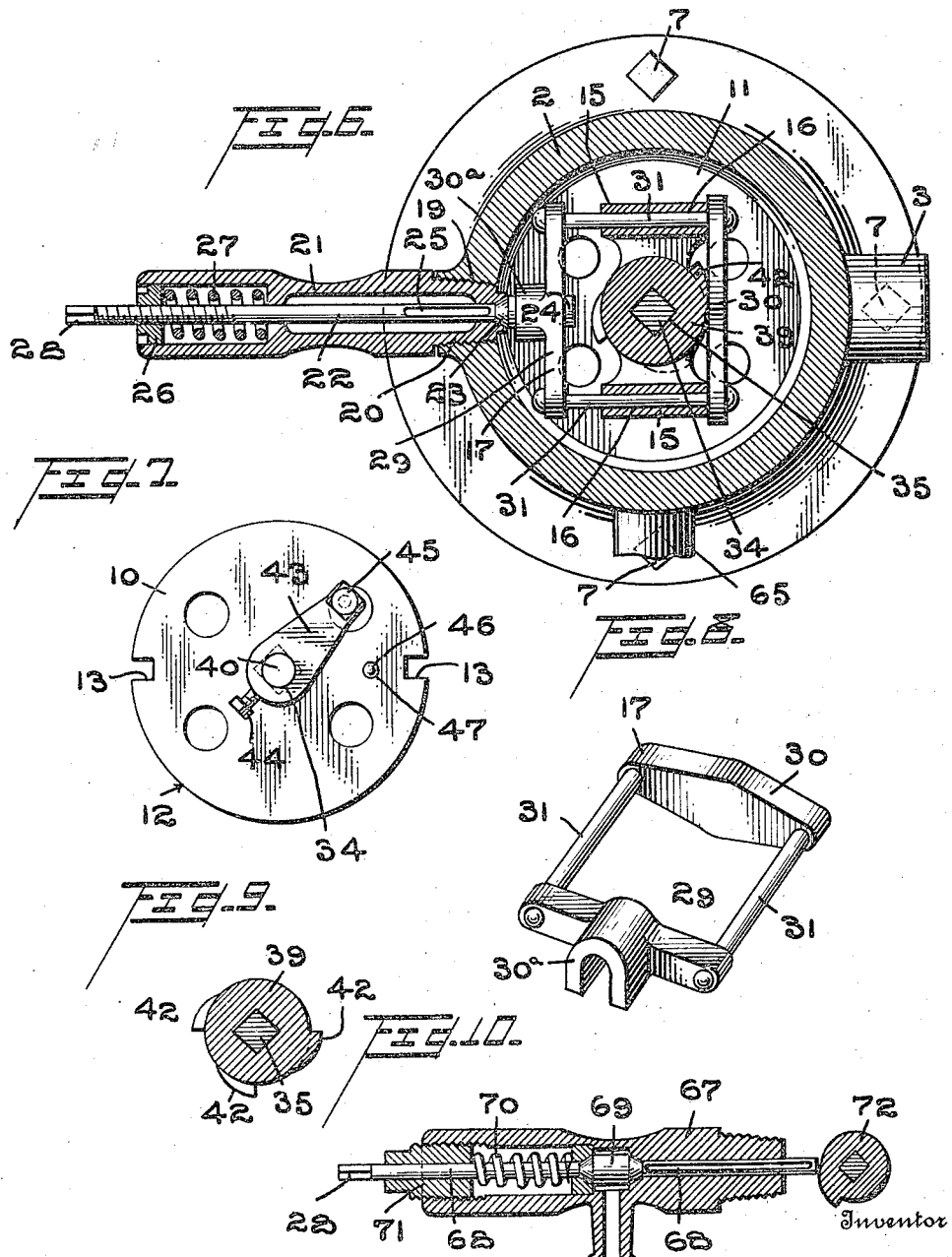

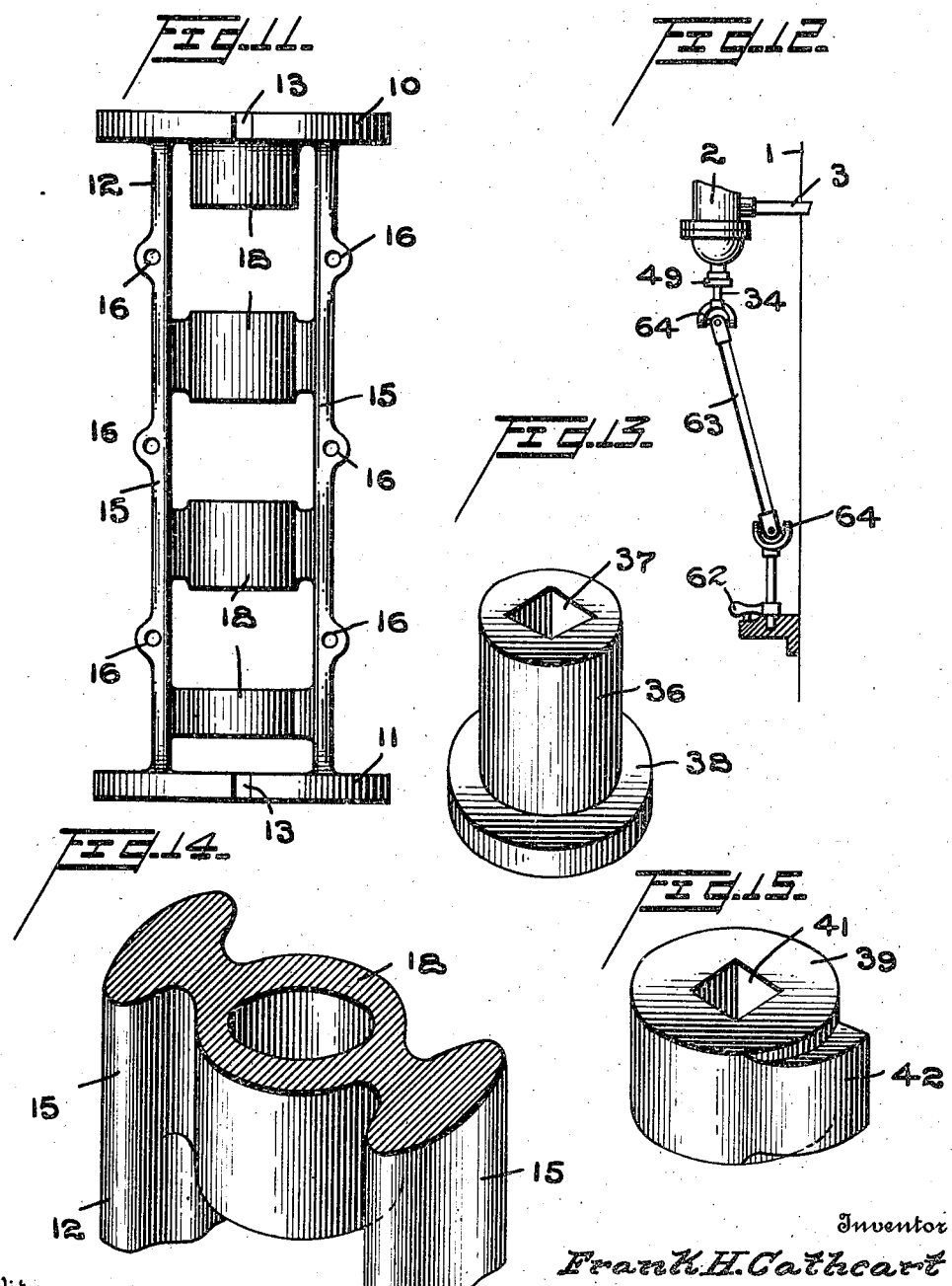

FRANK H. CATHCART, OF TRENTON, NEW JERSEY, ASSIGNOR, BY MESNE ASSIGNMENTS, TO SAFETY FIRST MANUFACTURING COMPANY, INCORPORATED, OF ALEXANDRIA, VIRGINIA, A CORPORATION OF VIRGINIA.

WATER-COLUMN AND GAGE-COCK.

1,269,050.      Specification of Letters Patent.      Patented June 11, 1918.

Application filed June 11, 1915. Serial No. 33,508.

*To all whom it may concern:*

Be it known that I, FRANK H. CATHCART, a citizen of the United States, residing at Trenton, in the county of Mercer and State of New Jersey, have invented certain new and useful Improvements in Water-Columns and Gage-Cocks, of which the following is a specification.

My invention relates to improvements in water columns and gage cocks, the object of the invention being to provide an improved water column and gage cocks with mechanically operated means for opening the column and the cocks at regular intervals, and so locate the operating means that the same may be conveniently reached by the engineer.

It is a well known fact that boiler explosions occur frequently because the operator is deceived in the height of the water, and this is due largely to the inaccessibility of the present water columns and gage cocks. Such devices are located at the water level which is usually at a point considerably above the reach of the engineer, so that he is required to use a ladder or a pole or some other means of reaching the column or the cocks. This difficulty in reaching the column and cocks frequently results in the engineer improperly performing his duties with regard to the same. It is the purpose of my improvements to so construct and operate the valve of the column and the cocks as to permit the engineer to manually operate them without inconvenience, and to so construct the operating means that the several valves will be operated in regular order, and thereby insure a proper reading of the gage at all times.

It is a further object of my invention to so construct the operating means that I can utilize well known types of water column now in use, involving the least possible amount of change to be made.

With these and other objects in view, the invention consists in certain novel features of construction and combinations and arrangements of parts as will be more fully hereinafter described and pointed out in the claims.

In the accompanying drawings:

Figure 1 is a view in front elevation of a well known type of steam boiler furnace illustrating my improvements on an exaggerated scale in connection therewith.

Fig. 2 is a view in longitudinal section through the water column showing the gage cocks partly in elevation and partly in section.

Fig. 3 is a fragmentary view of the lower end of the water column partly in longitudinal section illustrating the ratchet lever for operating the valve of the column and the gage cocks.

Fig. 4 is a view in horizontal section on the line 4—4 of Fig. 3.

Fig. 5 is a perspective view of the quadrant stop 54.

Fig. 6 is a view in horizontal section on the line 6—6 of Fig. 2.

Fig. 7 is a top plan view of the frame 12 showing the crank arm for operating the water column valve.

Fig. 8 is a perspective view of one of the valve operating yokes 17.

Fig. 9 is a view in transverse section through the upper cam and illustrating diagrammatically the positions of the other cams below.

Fig. 10 is a view in longitudinal section illustrating a modified form of gage cock.

Fig. 11 is a view in side elevation of the frame 12.

Fig. 12 is a fragmentary view partly in elevation and partly in section illustrating a modified form of valve operating mechanism.

Fig. 13 is a perspective view of one of the journal blocks 36.

Fig. 14 is a fragmentary sectional perspective view illustrating one of the bearing sleeves 18 to receive the block 36, and Fig. 15 is a perspective view of one of the cams 39.

1 represents a steam boiler furnace, and 2 represents a casing forming my improved water column which is connected by pipes 3 with the boiler 4. The casing 2 is located at the water level of the boiler, and is of general cylindrical form having heads 5 and 6 at its upper and lower ends secured thereto by bolts 7 as clearly shown in Fig. 2.

The ends of the cylinder are bored out as shown at 8 to receive inwardly projecting flanges 9 on the heads 5 and 6 respectively, and also to receive the upper and lower ends 10 and 11 respectively of a removable frame 12.

The ends 10 and 11 are in the form of circular disks having recesses 13 therein to receive lugs 14 on the casing and compel the frame to properly center in the casing. The ends 10 and 11 are connected by integral parallel uprights 15 having parallel cylindrical guides 16 for the valve operating yokes 17, which will be hereinafter described.

The frame 12 is also provided with a plurality of integral bearing sleeves 18 spaced apart as shown clearly in Fig. 11, and it is to be understood that the frame is to fit snugly within the casing 2, and support the valve operating mechanism to be hereinafter explained.

The casing 2 is provided with screw-threaded openings 19 to receive the threaded ends 20 of gage cocks 21. I preferably employ three of these gage cocks as called for by law, and locate them one above the other, spaced apart the desired distance, and all constructed precisely alike. The description therefore of one cock will apply alike to all.

Each cock 21 is provided with a valve stem 22 extending throughout the cock, and projecting beyond the same at both ends. On the stem 22, adjacent its inner end, a valve 23 is provided, and spaced from a head 24 on the extreme inner end of the stem.

The stem 22 is grooved longitudinally as shown at 25 so that a free outlet is had when the valve is open, and as seen clearly in Figs. 2 and 6, the valve 23 is held on its seat by the pressure from within the casing 2.

A nut 26 is screwed onto the threaded outer end of the stem 22, and bears against a coiled spring 27 in the cock. This spring tends to return the valve to closed position, and assists the pressure of steam to close the valve. The nut may be adjusted on the stem to vary the spring pressure as desired. The outer end of the stem 22 is made angular as shown at 28 to receive a wrench and allow the valve seat to be ground without dismantling the gage cock.

As I employ three gage cocks, it is necessary to employ three operating yokes 17. These yokes each comprise two cross heads 29 and 30 connected by parallel rods 31. The rods 31 move through the guides 16, and maintain the yoke in proper position. The head 29 is provided with an integral fork 30$^a$ which straddles the stem 22 between the valve 23 and the head 24, hence the movement of the yoke compels the movement of the valve.

The lower head 6 of the casing 2 is provided with an outlet 31$^a$ through which the water column may be blown out. A valve 32 is normally positioned against a valve seat 33 in the head 6, preventing any escape of water from the column. This valve 32 is fixed to a valve stem 34, which latter is preferably cylindrical at its lower end, rectangular throughout the greater portion of its upper end as shown at 35, and again cylindrical at its extreme upper end as shown at 40.

In the upper bearing sleeves 18, bearing blocks 36 are located. These blocks 36 have angular bores 37 to receive the angular portion 35 of stem 34. These blocks 36 have flanges 38 at their lower ends located against the lower ends of the bearing sleeves 18 and above cams 39.

The cams 39 have angular openings 41 to receive the angular portion 35 of stem 34, and turn with the same. The cams 39 are located inside of the yokes 17, and when the stem is revolved, their cam faces 42 engage the heads 30 of the yokes 17 and draw the valves 23 away from their seats to open the gage cocks.

On the upper cylindrical end 40 of the stem 34, I secure an arm 43 by means of a set screw 44, and provide at the free end of the arm, a vertically adjustable screw 45. The lower end of the screw 45 is adapted at each complete revolution of the stem 34 to engage a ball 46 seated in a recess 47 in the upper end 10 of frame 12. When the lower end of the screw 45 engages the ball, it will cause the stem 34 to momentarily move in an upward direction, thereby lifting the valve 32 from its seat 33, and permitting the casing 2 to be blown out.

It will be noted, particularly by reference to Fig. 9, that the cams 39 have their cam faces 42 arranged at an angle of ninety degrees (90°) to each other, so that at each quarter turn of the stem 34, one of the valves of the cocks or the valve 32 is caused to open, and as the arm 43 is located at an angle of ninety degrees (90°) with relation to the cams, the several valves are caused to operate in regular succession when the stem 34 is turned.

The lower head 6 is provided with an integral cylindrical extension 48 having a stuffing box 49 at its lower end securely packing the end of the stem 34 which projects below the extension as shown clearly in Fig. 3.

An arm 50 is mounted to oscillate on the lower end of stem 34, and is recessed in its upper surface to receive a ratchet wheel 51, which latter is fixed to the stem 34.

A spring-pressed pawl 52, carried by the arm 50, engages the ratchet wheel, and it will be observed that said ratchet wheel is provided with four recesses 53 corresponding in number and in proper relative relationship to the several valves of the column and cocks.

The arm 50 is adapted to be swung through the arc of a circle approximately ninety degrees (90°), and its movement is limited by means of a quadrant stop 54 which is securely clamped by means of a bolt 55 to the extension 48 as clearly shown.

The two members 56 of the quadrant stop are spaced apart a distance sufficient to allow the arm 50 to swing its proper distance, and serve to prevent the arm from moving beyond the proper distance by reason of the fact that the members 56 are engaged by a lug 57 which extends from the upper surface of the arm 50 near its free end.

The arm 50 is connected by a link 58 with a crank arm 59 on a shaft 60. This shaft 60 is supported in suitable bearings 61 on the furnace 1, and is provided at a convenient height from the floor with an operating arm 62, so that the engineer can conveniently reach this operating arm 62, and move the shaft 60 to operate the column and the gage cocks as will be readily understood.

Instead of providing the means for turning the stem 34 as above explained, I might employ a construction such as illustrated in Fig. 12, in which a shaft 63 constituting several sections connected by universal joints 64 may be employed. This shaft is connected to the stem 34 and is provided with an operating handle 62 in convenient reach of the engineer.

The operation is as follows:

Through the medium of the arm 62, shaft 60, arm 59 and link 58, the operator causes the arm 50 to oscillate through a ninety degree (90°) arc. At each forward movement of the arm 50, the stem 34 is given a quarter revolution. The first movement opens the valve 32 to blow out the column, the second movement operates the lowest cock, the next movement the cock next above, and the fourth movement the uppermost cock, so that at each complete revolution of the stem 34, the column is blown out, and each of the cocks is operated in succession. As this can be conveniently done at any time, there will be but small chance of its being neglected which is so common at the present time, and furthermore, the several valves must be operated in succession so that there is no possibility of the operator neglecting to open any of the valves.

In Fig. 1, I illustrate the several cocks 21 positioned at an angle to discharge into a drip pan 75 which is connected to a drip pipe 76 joining a drain pipe 77, the latter connected to the outlet 31ª. Adjacent the column I employ a water gage 65 and locate a pressure gage 66 at a convenient point.

In Fig. 10, I illustrate a modified form of gage cock 67 which I might employ in connection with my improvements. This gage cock 67 is provided with a stem 68 having a valve 69 thereon closing against the pressure of steam.

A spring 70 located around the stem 68, and bearing against an adjustable sleeve 71, exerts pressure on the valve to hold it in closed position, and the valve is opened by engagement of the cam 72 directly against the end of the stem, forcing the same longitudinally and moving the valve off the seat. In this construction it would, of course, be unnecessary to employ any yoke such as set forth in the preferred form of my invention.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination of a casing constituting a water column having a water outlet, a plurality of gage cocks communicating with the column above the outlet, a valve in the column normally closing the outlet, and means for successively opening said outlet valve and the cocks, substantially as described.

2. The combination with a casing having an opening and constituting a water column, and a plurality of gage cocks communicating therewith, of a valve in the column for closing said opening, and means inside of the column for successively opening and closing said valve and the cocks, substantially as described.

3. The combination with a casing constituting a water column, and a plurality of gage cocks communicating therewith, of a valve in the column, a stem secured to the said valve, means on the stem within the casing for operating the cocks, and means for moving the stem longitudinally when the latter is revolved, substantially as described.

4. The combination with a casing constituting a water column, a vertical series of gage cocks communicating with the column, and a valve controlling the outlet from the lower end of the column, of a stem in the column secured to the valve, cams on the stem controlling the operation of the gage cocks, means on the stem for moving the latter longitudinally to open the said valve when the stem is revolved, and means out-side the casing for turning the valve, substantially as described.

5. The combination with a casing constituting a water column, a vertical series of gage cocks communicating with the column, and a valve controlling the outlet from the lower end of the column, of a stem in the column secured to the valve, cams on the stem controlling the operation of the gage cocks, means on the stem for moving the latter longitudinally to open the said valve when the stem is revolved, and an oscillating arm constructed to impart a quarter turn to the stem at each oscillation of the arm, substantially as described.

6. The combination with a casing constituting a water column, a vertical series of gage cocks communicating with the column, and a valve controlling the outlet from the lower end of the column, of a stem in the column secured to the valve, cams on the stem controlling the operation of the gage cocks, means on the stem for moving the latter longitudinally to open the said valve when the stem is revolved, a quadrant stop secured to the lower end of the column, an arm mounted to oscillate on the stem and limited in its movement by the quadrant stop, and ratchet means connecting the stem and the arm, substantially as described.

7. The combination with a casing constituting a water column, a vertical series of gage cocks communicating with the column, and a valve controlling the outlet from the lower end of the column, of a stem in the column secured to the valve, cams on the stem controlling the operation of the gage cocks, means on the stem for moving the latter longitudinally to open the said valve when the stem is revolved, a quadrant stop secured to the lower end of the column, an arm mounted to oscillate on the stem and limited in its movement by the quadrant stop, ratchet means connecting the stem and the arm, a shaft having a handle thereon, a crank arm on the said shaft, and a link connecting the crank arm with the first-mentioned arm, substantially as described.

8. The combination with a casing constituting a water column, a vertical series of gage cocks communicating with the column, and a valve controlling the outlet from the lower end of the column, of a stem in the column secured to the valve, cams on the stem controlling the operation of the gage cocks, a frame in the casing providing rotary mounting for the stem, an arm secured to the upper end of the stem, an upwardly projecting device on the frame, and means on the arm adapted to engage the upwardly projecting device and lift the said valve from its seat at each complete revolution of the same, substantially as described.

9. The combination with a casing constituting a water column, a vertical series of gage cocks communicating with the column, and a valve controlling the outlet from the lower end of the column, of a stem in the column secured to the valve, cams on the stem controlling the operation of the gage cocks, a frame in the casing providing rotary mounting for the stem, an arm secured to the upper end of the stem, a ball supported at the upper end of the frame, and a screw carried by the outer end of the arm and adapted to engage the ball and lift the valve from its seat at each complete revolution of the stem, substantially as described.

10. The combination with a casing constituting a water column, a vertical series of gage cocks communicating with the water column, and a valve normally closing an outlet in the lower end of the column, of a frame secured within the casing and having a plurality of alined bearing sleeves, bearing blocks in the sleeves having angular openings therein, a stem secured to the valve and having an angular portion located in the angular openings in the blocks, cams between the bearing sleeves having angular openings receiving the angular portion of the stem, said cams constructed to operate the gage cocks in succession when the stem is turned, and means on the stem compelling the valve to open at each complete revolution of the stem, substantially as described.

11. The combination with a casing constituting a water column, a vertical series of gage cocks communicating with the water column, and a valve normally closing an outlet in the lower end of the column, of a frame secured within the casing and having a plurality of alined bearing sleeves, bearing blocks in the sleeves having angular openings therein, a stem secured to the first-mentioned valve and having an angular portion located in the angular openings in the blocks, cams between the bearing sleeves having angular openings receiving the angular portion of the stem, yokes mounted to slide in the frame, said yokes having forked ends engaging the valve stems of the gage cocks, and said yokes adapted to be moved in succession by the cams when the stem is revolved, and means on the stem compelling the valve to open at each complete revolution of the stem, substantially as described.

12. The combination with a casing constituting a water column, of a vertical series of gage cocks communicating with the column, and a valve in the lower end of the column controlling the outlet therefrom, of a stem connected to the first-mentioned valve and having means thereon for operating the first-mentioned valve and the said gage cocks in succession, each gage cock having a stem projecting therethrough, a spring exerting pressure on the stem normally holding the valve on its seat, and said stems having angular outer ends to facilitate the turning thereof to grind the valve seats, substantially as described.

13. The combination of a casing constituting a water column, having an opening therein and a valve for closing said opening, and a plurality of gage cocks communicating with the casing, and a common means operative to effect the opening of said cocks and valve, substantially as described.

In testimony whereof I have signed my name to this specification in the presence of two subscribing witnesses.

FRANK H. CATHCART.

Witnesses:
JNO. G. GRAHAM,
CHARLES W. CATHCART.

Copies of this patent may be obtained for five cents each, by addressing the "Commissioner of Patents, Washington, D. C."